United States Patent
Ito

(10) Patent No.: US 10,025,171 B2
(45) Date of Patent: Jul. 17, 2018

(54) IMAGE DISPLAYING APPARATUS, CONTROLLING METHOD THEREOF, AND PROGRAM

(71) Applicant: CANON KABUSHIKI KAISHA, Tokyo (JP)

(72) Inventor: Motohisa Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/455,789

(22) Filed: Mar. 10, 2017

(65) Prior Publication Data
US 2017/0261845 A1     Sep. 14, 2017

(30) Foreign Application Priority Data

Mar. 14, 2016   (JP) ................................ 2016-049899

(51) Int. Cl.
G03B 21/20     (2006.01)
G09G 3/34      (2006.01)

(52) U.S. Cl.
CPC ....... G03B 21/2053 (2013.01); G09G 3/3406 (2013.01)

(58) Field of Classification Search
CPC ............ G03B 21/2013; G03B 21/2033; G03B 21/2053; G09G 3/2018; G09G 3/2022; G09G 3/3406; G09G 3/3613; G09G 3/3648; G09G 3/3688; G09G 2310/066; G09G 2310/0235
See application file for complete search history.

(56) References Cited

U.S. PATENT DOCUMENTS

| | | | | |
|---|---|---|---|---|
| 2007/0126757 A1* | 6/2007 | Itoh | ...................... | G09G 3/3233 345/690 |
| 2009/0251056 A1* | 10/2009 | Cho | ...................... | H04N 9/3111 315/149 |
| 2013/0335642 A1* | 12/2013 | Fujioka | .............. | G03B 21/2033 348/744 |
| 2014/0063082 A1* | 3/2014 | Masuda | ............. | G03B 21/2013 345/690 |
| 2016/0164256 A1* | 6/2016 | Kuratomi | ............ | H01S 5/06825 353/85 |

FOREIGN PATENT DOCUMENTS

JP          2012-89454 A        5/2012

* cited by examiner

*Primary Examiner* — Sultan Chowdhury
(74) *Attorney, Agent, or Firm* — Carter, DeLuca, Farrell & Schmidt LLP

(57) ABSTRACT

An image displaying apparatus comprises a first light source section and a second light source section each configured to be able to change a percentage of a radiation luminous flux, and a controlling unit configured to control the first light source section and the second light source section such that the percentage of the radiation luminous flux obtained by combining together the radiation luminous flux from the first light source section and the radiation luminous flux from the second light source section continuously changes.

12 Claims, 8 Drawing Sheets

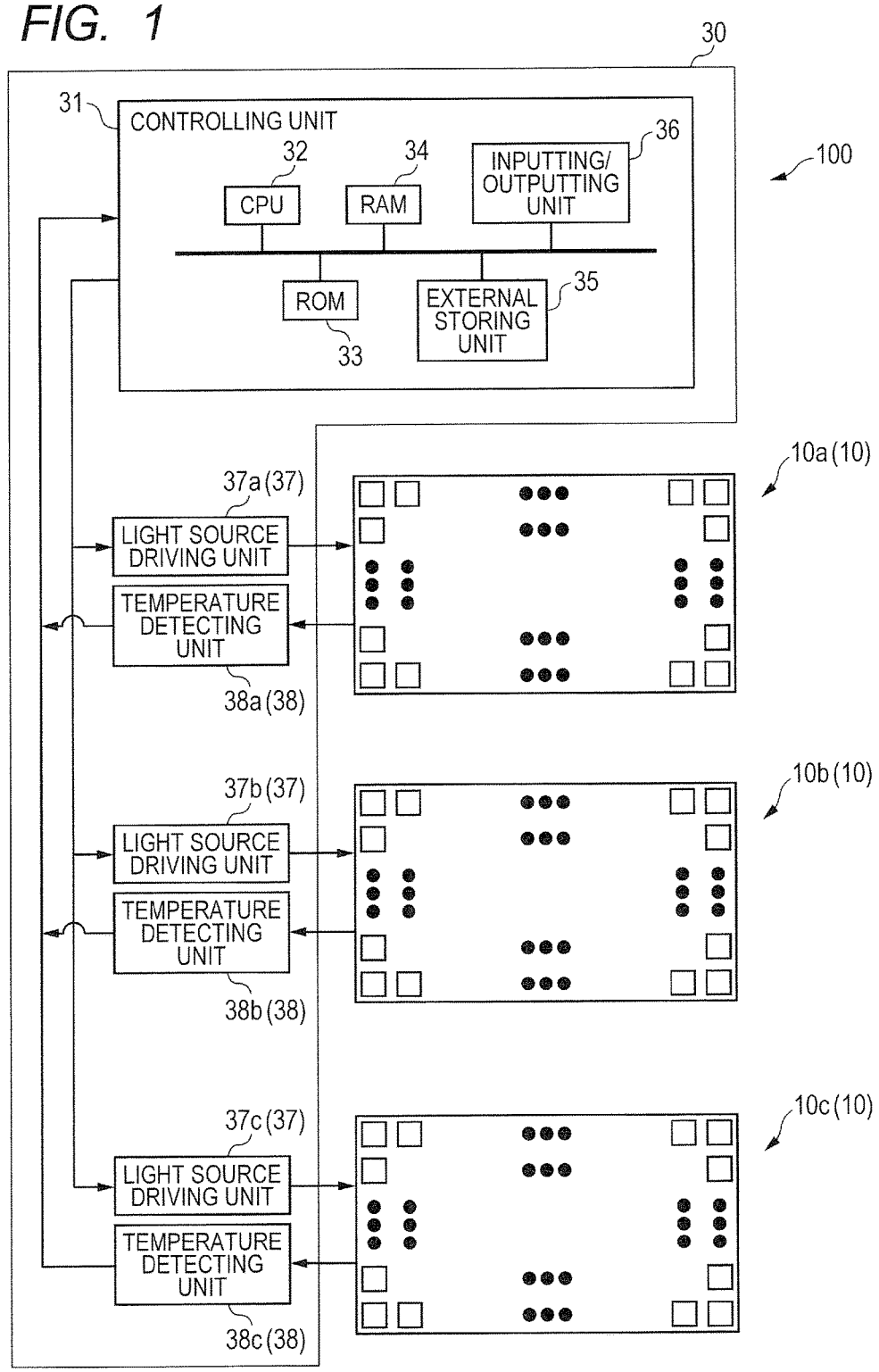

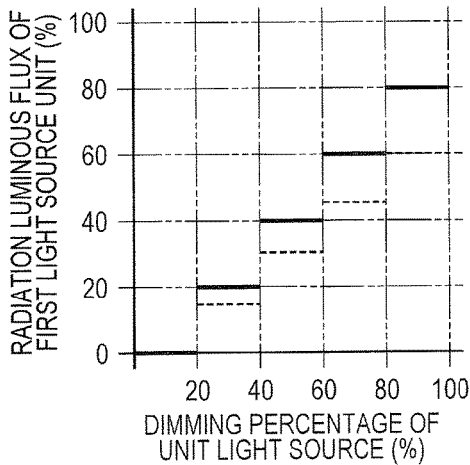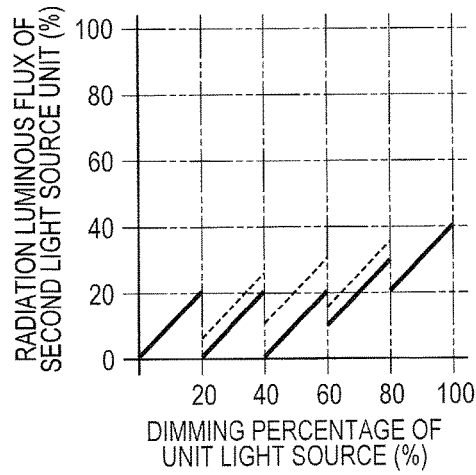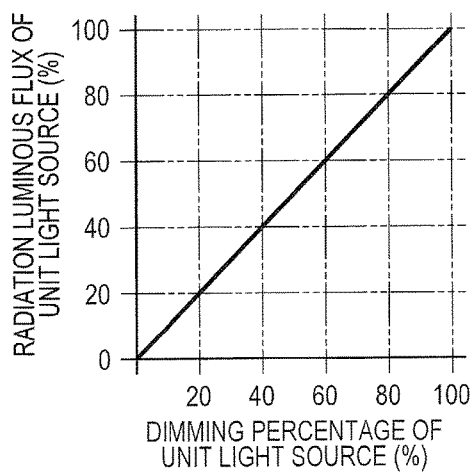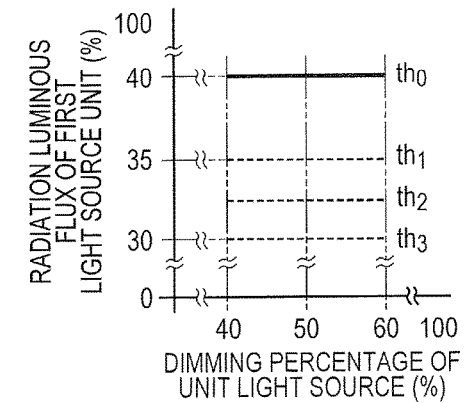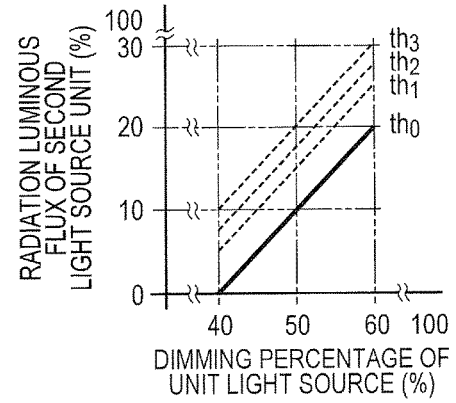

IMAGE DISPLAYING APPARATUS, CONTROLLING METHOD THEREOF, AND PROGRAM

BACKGROUND OF THE INVENTION

Field of the Invention

The present invention relates to an image displaying apparatus, a controlling method of the image displaying apparatus, a program to be used for performing the controlling method, and the like.

Description of the Related Art

In recent years, image displaying apparatuses such as a liquid crystal display, a plasma display, a projector and the like are widely used. In some of the image displaying apparatus like this, a semiconductor element such as a light emitting diode (LED), an organic light emitting diode (OLED), or a semiconductor laser diode LED is used as the light source.

Incidentally, Japanese Patent Application Laid-Open No. 2012-89454 discloses the light source controlling apparatus which controls a luminous flux radiated from a solid-state light source array including a plurality of semiconductor lasers, at a duty ratio between a light emitting period and a non-light emitting period. In this apparatus, by using the semiconductor element as the light source of an image displaying apparatus, it is possible to reduce power consumption and thus lengthen product lifetime.

However, in case of switching from non-light emission to light emission in the semiconductor element such as the semiconductor laser or the like as in Japanese Patent Application Laid-Open No. 2012-89454, a larger current must be applied as required luminance becomes high. An electrical noise occurs by a change in current, and, when the change amount of the current is large, a large amount of noises occur. Therefore, there is a problem that the large amount of noises occur when the non-light emission is switched to the light emission.

SUMMARY OF THE INVENTION

In order to solve the above problem, an image displaying apparatus according to the present invention is characterized by comprising a first light source section and a second light source section each configured to be able to change a percentage of a radiation luminous flux, and a controlling unit configured to control the first light source section and the second light source section such that the percentage of the radiation luminous flux obtained by combining together the radiation luminous flux from the first light source section and the radiation luminous flux from the second light source section continuously changes.

Further features of the present invention will become apparent from the following description of exemplary embodiments with reference to the attached drawings.

BRIEF DESCRIPTION OF THE DRAWINGS

FIG. 1 is a diagram showing an example of a configuration of an image displaying apparatus.

FIGS. 7A, 7B, 7C, 7D and 7E are diagrams for describing a dimming control of the third embodiment.

DESCRIPTION OF THE EMBODIMENTS

Figure 2A:
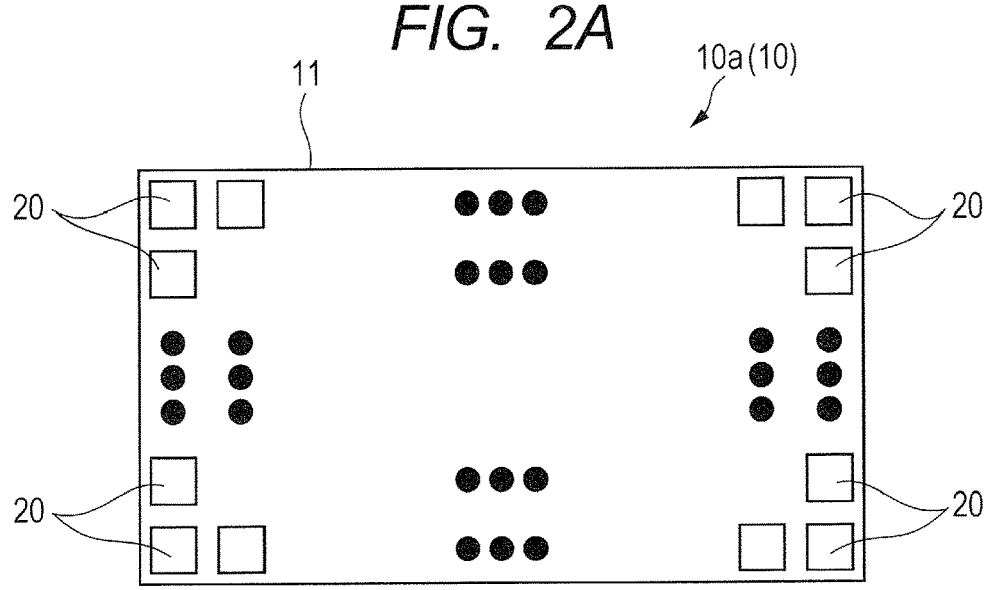
FIGS. 2A and 2B are diagrams showing an example of a configuration of a unit light source according to the first embodiment.

Hereinafter, embodiments of the present invention will be described with reference to the attached drawings. However, it is possible to modify the embodiments and details without departing from the spirit and scope of the present invention. That is, the present invention is not limited to the description of the present embodiment. Further, the embodiments described below may be implemented on hardware or by software excepting a case specifically limited. Note that the members having the same function are denoted by the same reference numerals in principle, and the description thereof will be appropriately omitted.

(First Embodiment)

FIG. 1 is a diagram showing an example of a configuration of an image displaying apparatus. Here, a case where an image displaying apparatus 100 is applied to a projector will be described.

The image displaying apparatus 100 includes a plurality of light source devices 10 (10a to 10c) and a controlling device 30.

The light source devices 10a to 10c radiate luminous fluxes respectively. The light source devices 10a to 10c of the present embodiment radiate the light of which a wavelength band corresponds to any one of the three primary colors of light. Specifically, the light source device 10a radiates red light, the light source device 10b radiates green light and the light source device 10c radiates blue light. In the following description, the red light of the three primary colors of light is denoted by R, the green light by G, and blue light by B unless there is the possibility of confusion.

FIG. 2A is a diagram showing the configuration of the light source devices 10a to 10c. Each of the light source devices 10a to 10c has the same configuration, and here, the light source device 10a will be described as an example.

In the light source device 10a, a plurality of unit light sources 20 are arranged in a matrix manner over the entire surface of a substrate 11. Here, the unit light source 20 refers to a light source of one unit that radiates the luminous flux necessary for displaying image data by a plurality of light source sections described later.

Figure 2B:
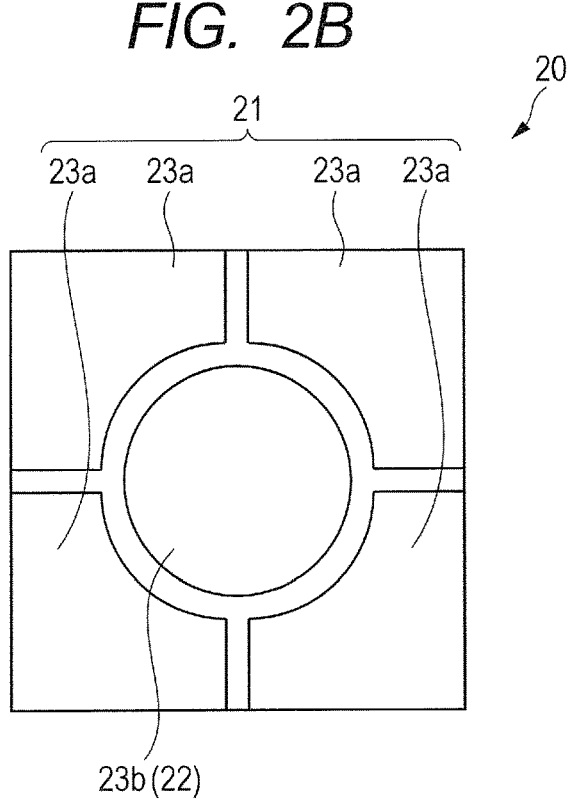

FIG. 2B is a diagram showing the configuration of the unit light source 20.

The unit light source 20 includes a first light source section 21 and a second light source section 22. In the unit light source 20 of the present embodiment, the first light source section 21 has four light sources 23a, and the second light source section 22 has one light source 23b. In the unit light source 20, the first light source section 21 is disposed in such a manner as to surround the second light source section 22, which is treated as a center. It is not required that the unit light source 20 and the pixel of an image to be displayed (projected) are to be coincided with each other, and the one unit light source 20 may be in charge of image display of an area composed of a plurality of pixels. Also, it is not required that the area, which the unit light source 20 is in charge of, has to have the same number of pixels in the vertical and horizontal directions.

The light sources used for the light source 23a and the light source 23b are white light sources or monochromatic light sources, and any light source may be used as long as it satisfies all the following conditions (1) to (3).

(1) Radiation luminous flux can be changed.

(2) Changing speed of a radiation luminous flux can follow images to be displayed.

(3) Required number of light sources to constitute the unit light source can be implemented.

For example, a light emitting diode (hereinafter, referred to as an LED), an organic light emitting diode (hereinafter, referred to as an OLED) or a semiconductor laser diode (hereinafter, referred to as an LD) can be used for the light source 23a and the light source 23b. The LED or the OLED used for the light source 23a and the light source 23b may be a white LED or a white OLED for radiating the white light, or a monochromatic LED or a monochromatic OLED for radiating each color of RGB which are three primary colors of light.

In the present embodiment, the four light sources 23a of the first light source section 21 are the white LEDs and the one light source 23b of the second light source section 22 is the monochromatic LED. The light sources 23a of all the first light source sections 21 included in the one light source device 10 are composed of white LEDs to which color filters of the wavelength band, which the light source device 10 is in charge of, are attached. The light sources 23b of the second light source sections 22 are composed of the monochromatic LEDs substantially having the same color in the wavelength band, which the light source device 10 is in charge of.

That is, all the unit light sources 20 of the light source device 10a that radiates R in the present embodiment are composed of the light sources 23a and 23b described below.

The unit light source 20 included in the light source device 10a that radiates R is composed of: the light source 23a of the first light source section 21 . . . white LED with red band color filter attached; and the light source 23b of the second light source section 22 . . . red LED.

Similarly, the light source device 10b that radiates G and the light source device 10c that radiates B are composed of the light sources 23a and 23b described below.

The unit light source 20 included in the light source device 10b that radiates G is composed of: the light source 23a of the first light source section 21 . . . white LED with green band color filter attached; and the light source 23b of the second light source section 22 . . . green LED.

The unit light source 20 included in the light source device 10c that radiates B is composed of: the light source 23a of the first light source section 21 . . . white LED with blue band color filter attached; and the light source 23b of the second light source section 22 . . . blue LED.

Note that the number of the light sources 23a of the first light source section 21 and the number of the light sources 23b of the second light source section 22 are not limited to those in the above-described embodiment. The configurations of the light source 23a of the first light source section 21 and the light source 23b of the second light source section 22 are not limited to the combination of the white LED and the monochromatic LED. For example, both the light source 23a of the first light source section and the light source 23b of the second light source section 22 may be white LEDs or white OLEDs. In this case, the image displaying apparatus 100 can be configured by using the single light source device 10.

Next, returning to FIG. 1, the controlling device 30 will be described.

The controlling device 30 includes a controlling unit 31, light source driving units 37 (37a to 37c) and temperature detecting units 38 (38a to 38c).

The controlling unit 31 functions as, for example, a computer, and performs the dimming control of each of the light source devices 10a to 10c. The controlling unit 31 includes a CPU 32, a ROM 33, a RAM 34, an external storing unit 35 and an inputting/outputting unit 36. The CPU 32 executes the program stored in the ROM 33 or the external storing unit 35 to realize the dimming control of each of the light source devices 10a to 10c. Specifically, the CPU controls radiation luminous fluxes of the first light source section 21 and the second light source section 22 of each of the unit light sources 20 in the light source devices 10a to 10c through the light source driving units 37 (37a to 37c) based on the image data. In addition, the CPU 32 stores the light sources 23a and 23b of the respective light source devices 10a to 10c, which are currently radiating the luminous flux, and the current value, which is input, into the RAM. Further, the CPU 32 stores the light emitting time of the light sources 23a and 23b of the respective light source devices 10a to 10c and the current value, which is input at that time, into the external storing unit 35 associated with each of the light sources 23a and 23b.

The ROM 33, which is a nonvolatile memory, stores programs to be executed by the CPU 32, various data and the like. The RAM 34, which is a volatile memory, temporarily stores data, which the CPU 32 read out from the ROM 33 and the external storing unit 35, data calculated by the CPU 32, and the like. The external storing unit 35, which is, for example, a hard disk drive, stores programs to be executed by the CPU 32, image data to be displayed by the image displaying apparatus 100, data indicating the relationship between the dimming percentage of the unit light source 20 and the percentage of the luminous flux radiated from the first light source section 21 or the second light source section 22, and the like. A controlling method of the dimming control and a procedure of the control, which will be described later, and the like are stored in the programs. The inputting/outputting unit 36 transmits and receives data between the own unit and the external devices. The inputting/outputting unit 36, for example, receives image data to be displayed.

The light source driving units 37 (37a to 37c) are connected to the controlling unit 31 and also to the light source devices 10 (10a to 10c). The light source driving units 37a to 37c perform the dimming control of the light source devices 10a to 10c based on an instruction from the controlling unit 31. Specifically, the light source driving units 37a to 37c select the light source 23a, to which the current is to be supplied, in the first light source section 21 or supply the current, of which the value is instructed, to the first light source section 21 and the second light source section 22.

The temperature detecting units 38 (38a to 38c) are connected to the controlling unit 31 and also to the light source devices 10 (10a to 10c). The temperature detecting units 38a to 38c respectively detect temperatures of the unit light sources 20 of the light source devices 10a to 10c. The temperature detecting units 38a to 38c transmit the detected temperature information to the controlling unit 31.

In addition, the image displaying apparatus 100 has an optical modulator for R (red), an optical modulator for G (green) and an optical modulator for B (blue), which are not illustrated, that modulate the luminous fluxes radiated from the light source devices 10a to 10c. The controlling unit 31 controls the optical modulator for R, the optical modulator for G and the optical modulator for B according to the image data. The controlling unit 31 modulates the luminous flux radiated from the light source device 10a via the optical modulator for R and modulates the luminous flux radiated from the light source device 10b via the optical modulator for G and modulates the luminous flux radiated from the light source device 10c via the optical modulator for B. The controlling unit 31 synthesizes the modulated luminous fluxes and projects images on a projection surface such as a screen to display the images.

Next, the dimming control performed to the unit light sources 20 by the controlling unit 31 will be described with reference to FIGS. 3A to 3C and FIGS. 4A to 4D. The following dimming control can be realized by executing the program stored in the external storing unit 35 by the CPU 32 of the controlling unit 31.

Figure 3A:
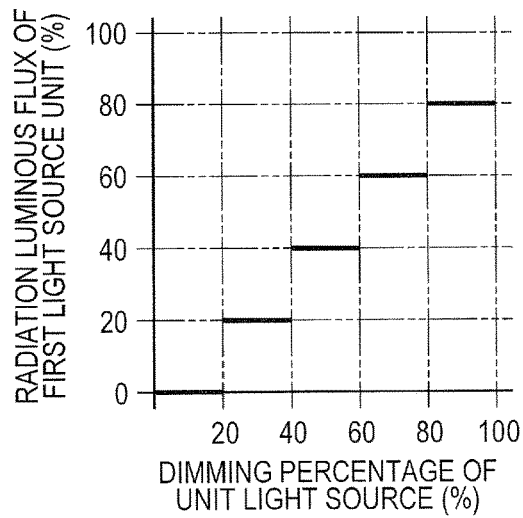
FIGS. 3A, 3B and 3C are diagrams for describing a dimming control of the first embodiment.
Figure 3B:
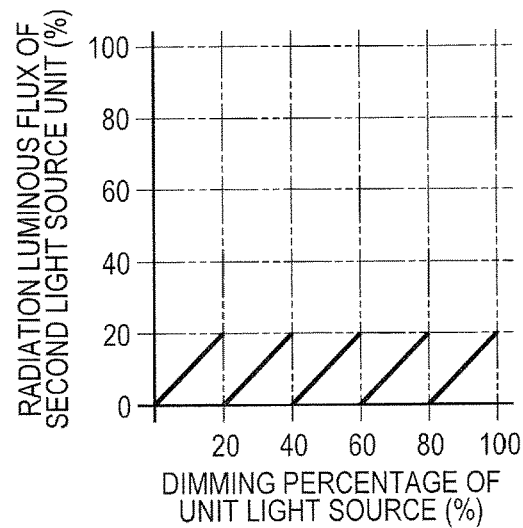
Figure 3C:
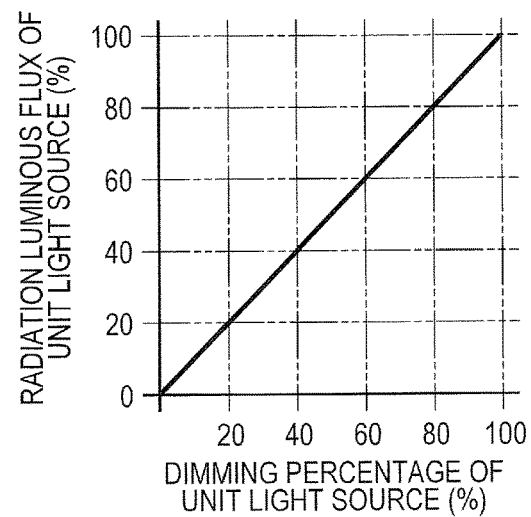

FIGS. 3A to 3C are diagrams showing the relationship between the luminous flux radiated by the first light source section 21, the luminous flux radiated by the second light source section 22 and the luminous flux radiated by the unit light source 20 for the dimming percentage of the unit light source 20. The horizontal axis of the graph indicates the dimming percentage of the unit light source 20. This value is the percentage of the luminous flux radiated by the unit light source 20 to the maximum value of the luminous flux radiated by the one unit light source 20.

FIG. 3A is a graph showing the relationship between the dimming percentage of the unit light source 20 and the luminous flux radiated by the first light source section 21. The vertical axis of the graph indicates the percentage of the luminous flux radiated by the first light source section 21 to the maximum value of the luminous flux radiated by the one unit light source 20. That is, a fact that the percentage of the radiation luminous flux of the first light source section 21 is equal to 40% means that the first light source section 21 radiates the luminous flux with 40% of the maximum value of the luminous flux radiated by the one unit light source 20. For example, assuming that the maximum value of the luminous flux radiated by the one unit light source 20 is equal to 10 [lm], if the percentage of the radiation luminous flux of the first light source section 21 is equal to 40%, the second light source section 22 radiates the luminous flux of which the luminance value is equal to 4 [lm].

FIG. 3B is a graph showing the relationship between the dimming percentage of the unit light source 20 and the luminous flux radiated by the second light source section 22. The vertical axis of the graph indicates the percentage of the luminous flux radiated by the second light source section 22 to the maximum value of the luminous flux radiated by the one unit light source 20.

FIG. 3C is a graph showing the relationship between the dimming percentage of the unit light source 20 and the luminous flux radiated by the unit light source 20. The horizontal axis of the graph indicates the percentage of the luminous flux radiated by the unit light source 20 to the maximum value of the luminous flux radiated by the one unit light source 20.

As illustrated in FIG. 3A, in the present embodiment, the luminous flux radiated by the first light source section 21 can stepwisely change to the maximum value of the luminous flux radiated by the one unit light source 20. Here, the luminous flux radiated by the first light source section 21 changes at five stages of 0%, 20%, 40%, 60% and 80% which are equal intervals. The controlling unit 31 can realize the dimming control of the first light source section 21 by any one of the following controlling methods (A) to (C).

(A) The number of light sources 23a that radiate luminous flux in the first light source section 21 is controlled, and the amount of the radiation luminous flux is not controlled.

(B) The four light sources 23a of the first light source section 21 constantly radiate luminous fluxes and control the amount of the radiation luminous flux.

(C) The number of light sources 23a that radiate the luminous flux in the first light source section 21 and the amount of the radiation luminous flux are controlled.

However, the dimming control of the first light source section 21 is not limited to that in the above-described controlling method.

Next, an example of the above-described controlling method (A) will be described.

In the control means (A), the relationship between the percentage of the luminous flux radiated by the first light source section 21 and the number of the light sources 23a radiating the luminous fluxes is as following table.

| Percentage of luminous flux radiated by first light source section 21 | Number of light sources 23a radiating luminous flux |
| --- | --- |
| 0% | 0 |
| 20% | 1 |
| 40% | 2 |
| 60% | 3 |
| 80% | 4 |

FIGS. 4A to 4D are diagrams showing light emission patterns of the first light source section 21. In FIGS. 4A to 4D, the light sources 23a radiating the luminous fluxes are indicated by white portions and the light sources 23a not radiating the luminous fluxes are indicated by hatched portions. In the case where the number of the light sources 23a, which radiate the luminous flux, is one, there are four kinds of patterns indicated in FIG. 4A.

Figure 4A:
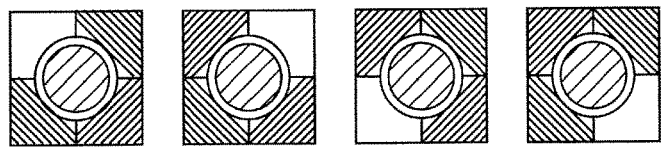
FIGS. 4A, 4B, 4C and 4D are diagrams for describing the dimming control of the first embodiment.

In the controlling method (A), if the percentage of the luminous flux radiated by the first light source section 21 is equal to 20%, that is, the number of the light sources 23a which radiate the luminous flux is one, the controlling unit 31 selects the pattern from among the four kinds of patterns indicated in FIG. 4A and controls the unit light source 20 such that the luminous flux is radiated with the selected pattern according to the following procedures.

Figure 4B:
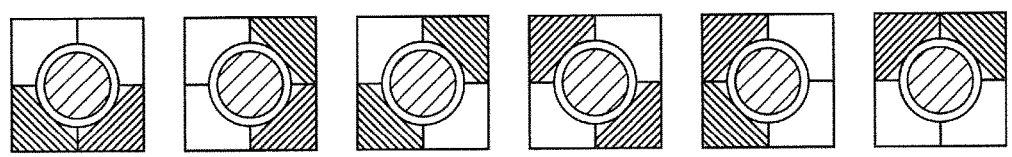

Similarly, if the percentage of the luminous flux radiated by the first light source section 21 is equal to 40%, the controlling unit 31 selects the pattern from among the six kinds of patterns indicated in FIG. 4B and controls the unit light source 20 such that the luminous flux is radiated with the selected pattern.

Figure 4C:
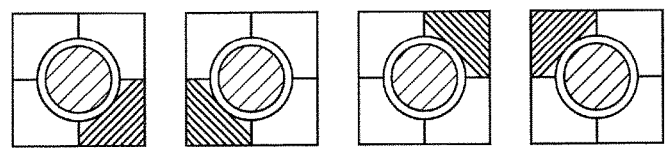

Likewise, if the percentage of the luminous flux radiated by the first light source section 21 is equal to 60%, the controlling unit 31 selects the pattern from among four kinds of patterns indicated in FIG. 4C and controls the unit light source 20 such that the luminous flux is radiated with the selected pattern.

Procedure (1)

If the percentage of the luminous flux radiated by the first light source section 21 is equal to 20%, the light source 23a having the minimum light emitting time is provided.

If the percentage of the luminous flux radiated by the first light source section 21 is equal to 40% or 60%, the combination of the light sources 23a having the minimum total light emitting time is provided.

Procedure (2)

If there are plural combinations of the light sources 23a having the minimum light emitting time or the light sources 23a having the minimum total light emitting time, the light sources 23a which are not currently radiating the luminous fluxes or the combination thereof are provided.

Procedure (3)

If there are plural combinations of the light sources 23a having the minimum light emitting time or the light sources 23a having the minimum total light emitting time and there are plural light sources 23a which are not currently radiating the luminous fluxes or combinations thereof, a pattern different from that of the last time among the light sources 23a which are not currently radiating the luminous fluxes or the combination thereof is provided.

Procedure (4)

If there are plural combinations of the light sources 23a having the minimum light emitting time or the light sources 23a having the minimum total light emitting time and there are not the light sources 23a which are not currently radiating the luminous fluxes or the combination thereof, a pattern different from that of the last time is provided.

As described above, the controlling unit 31 stores the light emitting time used in emitting the light, the current value and the light source 23a currently radiating the luminous flux by associating with the each light source 23a of the first light source section 21. Therefore, the controlling unit 31 can select the light source 23a, of which the light emitting time is short, or the combination of the light sources 23a, in which the total light emitting time is reduced, by reading out the light emitting time of the each light source 23a. In addition, the controlling unit 31 can select the light source 23a which is not currently radiating the luminous flux by reading out information of the light source 23a which is currently radiating the luminous flux.

In this manner, the controlling unit 31 selects the light source 23a, which radiates the luminous flux, in the first light source section 21 based on the light emitting time or the current state, thereby homogenizing the light emitting time and prolonging the product life.

Next, an example of the above-described controlling method (B) will be described.

In the controlling method (B), the controlling unit 31 controls current values to be respectively input to the light source 23a of the first light source section 21 via the light source driving unit 37, whereby the luminous flux radiated from the first light source section 21 is controlled.

Next, an example of the above-described controlling method (C) will be described.

In the controlling method (C), the relationship between the percentage of the luminous flux radiated by the first light source section 21 and the number of the light sources 23a radiating the luminous flux is shown in the following table.

| Percentage of luminous flux radiated by first light source section 21 | Number of light sources 23a radiating luminous flux |
| --- | --- |
| 0% | 0 |
| 20% | 2 |
| 40% | 2 |
| 60% | 4 |
| 80% | 4 |

In the controlling method (C), if the percentage of the luminous flux radiated by the first light source section 21 is equal to 20% or 40%, the controlling unit 31 selects the pattern from among six kinds of patterns indicated in FIG. 4B and controls the unit light source 20 such that the luminous flux is radiated with the selected pattern according to the following procedures.

Figure 4D:
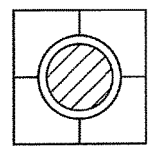

Similarly, if the percentage of the luminous flux radiated by the first light source section 21 is equal to 60% or 80%, the controlling unit 31 controls the unit light source 20 such that the luminous flux is radiated with the pattern indicated in FIG. 4D.

Procedure (1)

The combination of the light sources 23a having the smallest sum of the input current value×the light emitting time is provided.

Procedure (2)

If there are plural combinations of the light sources 23a having the smallest sum of the input current value×the light emitting time, the combination of the light sources 23a which are not currently radiating the luminous flux is provided.

Procedure (3)

If there are plural combinations of the light sources 23a having the smallest sum of the input current value×the light emitting time and plural combinations of the light sources 23a which are not currently radiating the luminous fluxes, a pattern different from that of the last time among the combinations of the light sources 23a which are not currently radiating the luminous fluxes is provided.

Procedure (4)

If there are plural combinations of the light sources 23a having the smallest sum of the input current value×the light emitting time and there is not the combination of the light sources 23a which are not currently radiating the luminous fluxes, a pattern different from that of the last time is provided.

The controlling unit 31 can select a combination of the light sources 23a having a small sum of the input current value×the light emitting time by reading out the light emitting time and the current value for each of the light sources 23a.

In this manner, the controlling unit 31 selects the light source 23a, which radiates the luminous flux, in the first light source section 21 based on the input current value, the light emitting time and the current state, thereby homogenizing the light emitting time and prolonging the product life.

Next, the dimming control of the second light source section 22 will be described.

As illustrated in FIG. 3B, the luminous flux radiated by the second light source section 22 can continuously change steplessly to the maximum value of the luminous flux radiated by the one unit light source 20. Here, the luminous flux radiated by the second light source section 22 can change steplessly within the range of 0% to 20%. The controlling unit 31 controls the current value to be input to the light source 23b of the second light source section 22 via the light source driving unit 37, thereby performing the dimming control of the second light source section 22.

The controlling unit 31 can steplessly and linearly control the luminous flux of the one unit light source 20 within the whole range of 0% to 100% in the entire of the unit light sources 20 as illustrated in FIG. 3C by performing the dimming control of the first light source section 21 and the second light source section 22.

As described above, the image displaying apparatus 100 has the first light source section 21 and the second light source section 22 which can change the percentage of the luminous flux to be radiated. That is, the first light source section 21 and the second light source section 22 can change the percentage of the luminous flux to be radiated. As illustrated in FIG. 3C, the controlling unit 31 controls the first light source section 21 and the second light source section 22 so as to be able to continuously change the luminous flux, which is a combination of the luminous flux radiated from the first light source section 21 and the luminous flux radiated from the second light source section 22. Therefore, the change amount of the currents to be respectively supplied to the first light source section 21 and the second light source section 22 can be suppressed as compared with the case where the luminous flux can be continuously changed only by the one light source section, and the noise generation can be reduced.

Further, in a semiconductor element such as an LED that emits light when the current is applied, there is such a characteristic, in which the radiation efficiency decreases as the current to be applied more increases. More specifically, while (the radiation luminous amount/the applied current) is substantially constant in a range where the current to be applied is a small current, (the radiation luminous amount/the applied current) gradually decreases as the current to be applied more increases. Therefore, the radiation efficiencies of the first light source section 21 and the second light source section 22 are improved and the consumed power can be suppressed by suppressing the currents respectively applied to the first light source section 21 and the second light source section 22 as in the present embodiment. Further, in the area where (the radiation luminous amount/the applied current) is substantially constant, the dimming control can be easily performed in order to control the luminous fluxes radiated from the first light source section 21 and the second light source section 22. Further, the percentage of the luminous flux radiated from the first light source section 21 is substantially constant in the range of the predetermined percentage of the luminous flux radiated from the unit light source 20, specifically, the range of 20% to 40%, the range of 40% to 60%, the range of 60% to 80% and the range of 80% to 100%. Therefore, the dimming control of the first light source section 21 can be easily performed.

In addition, the controlling unit 31 can easily perform the dimming control of the first light source section by enabling to stepwise change the luminous flux radiated from the first light source section 21 as illustrated in FIG. 3A. In particular, the dimming control can be easily performed by controlling the dimming of the first light source section 21 by the number of the light sources 23a that radiate luminous flux. At this time, the controlling unit 31 can prolong the product life by selecting the light source 23a having a short light emitting time as the light source 23a that radiates the luminous flux in the first light source section 21. On the other hand, the controlling unit 31 can continuously change the luminous flux radiated from the second light source section 22 as illustrated in FIG. 3B. In this case, since the control can be performed in the area where (the radiation luminous amount/the applied current) is substantially constant, the dimming control can be easily performed even when the second light source section 22 can be continuously changed.

Next, a case where the image displaying apparatuses 100 are applied to a multi-projection system serving as an image displaying system will be described.

The multi-projection system is such a system in which images displayed by a plurality of image displaying apparatuses are displayed in a large screen, where each images are adjacent to each other. In the multi-projection system, in order to make the boundary between adjacent images inconspicuous, a part of adjacent images displayed by the image displaying apparatuses is displayed so as to be overlapped. At this time, the luminance of the overlapping areas, where plural images are overlapped, becomes higher than the other areas. Therefore, each of the image displaying apparatuses uses a method of suppressing a luminance signal of the image in the overlapping area and performing the control so as to homogenize the luminance. At this time, such a phenomenon called as black floating, in which black that looks gray instead of black appears on the overlapping area, occurs.

In the present embodiment, the occurrence of black floating on the overlapping area can be reduced by applying the above-described image displaying apparatuses 100 to the multi-projection system. Hereinafter, the multi-projection system includes a first image displaying apparatus 100a and a second image displaying apparatus 100b. Further, in order to simplify the understanding, a case where the first image displaying apparatus 100a and the second image displaying apparatus 100b are fixed at adjacent positions and the overlapping area to be described later does not fluctuate will be described. Note that the first image displaying apparatus 100a and the second image displaying apparatus 100b have the same configuration as that of the above-described image displaying apparatus 100.

Figure 5A:
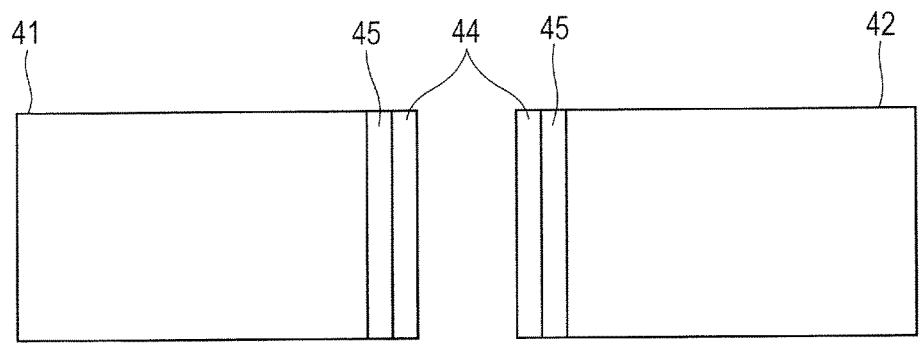
FIGS. 5A and 5B are diagrams for describing a multi-projection system.

FIG. 5A is a diagram showing an example of a first image 41 displayed by the first image displaying apparatus 100a and a second image 42 displayed by the second image displaying apparatus 100b.

Figure 5B:
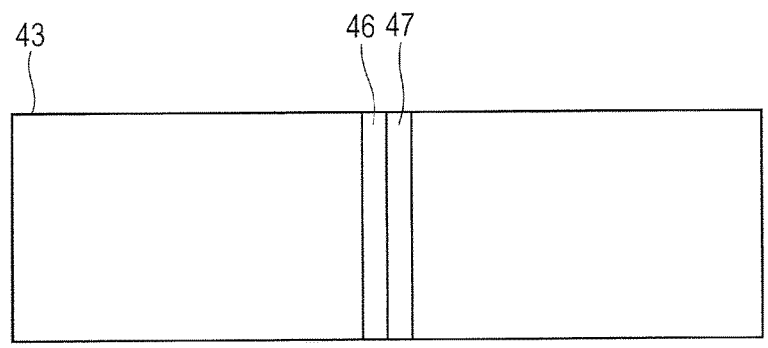

FIG. 5B is a diagram showing an example of an image 43 in which the first image 41 and the second image 42 are combined so as to partially overlap in the horizontal direction. Here, the first image 41 and the second image 42 are images different from each other except for the overlapping area.

As illustrated in FIG. 5A, a first overlap margin 44 and a second overlap margin 45 are set in the first image 41 and the second image 42 respectively.

As illustrated in FIG. 5B, the first image displaying apparatus 100a and the second image displaying apparatus 100b display the first overlap margin 44 and the second overlap margin 45 so as to be overlapped each other, thereby creating a first overlapping area 46 and a second overlapping area 47.

Here, the first overlapping area 46 is such an area, where the second overlap margin 45 of the first image 41 is overlapped with the first overlap margin 44 of the second image 42.

Further, the second overlapping area 47 is such an area, where the first overlap margin 44 of the first image 41 is overlapped with the second overlap margin 45 of the second image 42.

Next, a control performed by the each controlling unit 31 of the first image displaying apparatus 100a and the second image displaying apparatus 100b, which radiates the luminous flux to the first overlapping area 46 and the second overlapping area 47 so as to be radiated to become the percentage of 100% at the maximum level in accordance with the image data, will be described.

In the present embodiment, the controlling unit 31 suppresses the luminous flux to be radiated to the position of the first overlap margin 44 to the percentage of 20% at the maximum level and suppresses the luminous flux to be radiated to the position of the second overlap margin 45 to the percentage of 80% at the maximum level, thereby reducing the black floating in the overlapping area.

In order to suppress the radiation luminous flux of the first overlap margin 44 to the percentage of 20% at the maximum level, the each controlling unit 31 performs the dimming control to the unit light source 20 which, radiates the luminous flux to the first overlap margin 44, such that the dimming percentage of the unit light source 20 becomes the percentage from 0% to 20% based on the graph of FIG. 3C. Here, the controlling unit 31 previously stores the unit light source 20 which radiates the luminous flux to the first overlap margin 44. Accordingly, with respect to the unit light source 20 which radiates the luminous flux to the first overlap margin 44, the each controlling unit 31 sets the radiation luminous flux of the first light source unit 22 to the percentage of 0% based on the graph of FIG. 3A and sets to be able to change the radiation luminous flux of the second light source section 22 within the range of 0% to 20% based on the graph of FIG. 3B.

On the other hand, in order to suppress the radiation luminous flux of the second overlap margin 45 to the percentage of 80% at the maximum level, the each controlling unit 31 performs the dimming control to the unit light source 20, which radiates the luminous flux to the second overlap margin 45, such that the dimming percentage of the unit light source 20 becomes the percentage from 0% to 80% based on the graph of FIG. 3C. Here, the controlling unit 31 previously stores the unit light source 20 which radiates the luminous flux to the second overlap margin 45. Accordingly, with respect to the unit light source 20 which radiates the luminous flux to the second overlap margin 45, the each controlling unit 31 sets the radiation luminous flux of the first light source unit 21 to the percentage from 0% to 60% based on the graph of FIG. 3A and sets to be able to change the radiation luminous flux of the second light source section 22 within the range of 0% to 20% based on the graph of FIG. 3B.

According to the above-described dimming control, the radiation luminous flux in the each overlapping area has the following values.

The first overlapping area 46: the overlap with the second overlap margin 45 of the first image 41 and the first overlap margin 44 of the second image 42=80%+20%=100%.

The second overlapping area 47: the overlap with the first overlap margin 44 of the first image 41 and the second overlap margin 45 of the second image 42=20%+80%=100%.

Therefore, both the first overlapping area 46 and the second overlapping area 47 have the radiation luminous flux of 100%, and this value is equal to that of the radiation luminous flux of the area other than the overlapping area.

Next, a value of the black floating in the each overlapping area becomes the value described below. Here, BL (black level) is a value of the black floating when the luminous flux radiated by the unit light source 20 is at the percentage of 100%. That is, the BL is the maximum value of the black floating of the first image 41 or the second image 42.

The first overlapping area 46: the overlap with the second overlap margin 45 of the first image 41 and the first overlap margin 44 of the second image 42=80%×BL+20%×BL=BL.

The second overlapping are 47: the overlap with the first overlap margin 44 of the first image 41 and the second overlap margin 45 of the second image 42=20%×BL+80%×BL=BL.

Therefore, both the first overlapping area 46 and the second overlapping area 47 have a black floating value of BL, and this value is equal to the maximum value of the black floating in the area other than the overlapping area, and the black floating can be suppressed on the overlapping area.

Although the case of setting the radiation luminous flux of the overlapping area to the percentage of 100% at the maximum level has been described here, the percentage of the radiation luminous flux changes depending on the image data. For example, when the radiation luminous flux is allowed to be the percentage of 50%, the each controlling unit 31 performs the dimming control such that the radiation luminous flux of the second overlap margin 45 of the first image 41 is set to the percentage of 40% and the radiation luminous flux of the first overlap margin 44 of the second image 42 becomes the percentage of 10% with respect to the first overlapping area 46. On the other hand, the controlling unit 31 performs the dimming control such that the radiation luminous flux of the first overlap margin 44 of the first image 41 is set to the percentage of 10% and the radiation luminous flux of the second overlap margin 45 of the second image 42 becomes the percentage of 40% with respect to the second overlapping area 47.

As described above, in the present embodiment, a plurality of image displaying apparatuses 100 are applied to a multi-projection system, and the each controlling unit 31 performs the dimming control of the first light source section 21 and the second light source section 22 of the unit light source 20 such that the radiation luminous flux in the image overlapping area becomes the percentage of 100% at the maximum level. Therefore, the black floating in the overlapping area can be made equal to the black floating in the area other than the overlapping area, and the black floating on the overlapping area can be suppressed.

In addition, as in the present embodiment, a plurality of overlap margins are set in the image displayed by the one image displaying apparatus 100 as illustrated in FIG. 5A, and an end portion of the image can be smoothly displayed by setting that the maximum value of the percentage of the radiation luminous flux is more reduced as the overlap margin gets closer to the end portion. In the above-described embodiment, the case where the overlap margins are the first overlap margin 44 and the second overlap margin 45 has been described, but it may be one overlap margin and also may be three or more overlap margins.

(Second Embodiment)

Next, the dimming control according to the second embodiment will be described with reference to FIGS. 6A to 6C.

Figure 6A:
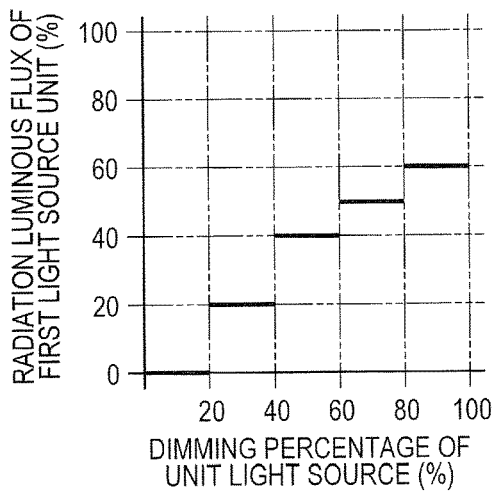
FIGS. 6A, 6B and 6C are diagrams for describing a dimming control of the second embodiment.

FIG. 6A is a graph showing the relationship between the dimming percentage of the unit light source 20 and the luminous flux radiated by the first light source section 21. FIG. 6B is a graph showing the relationship between the dimming percentage of the unit light source 20 and the luminous flux radiated by the second light source section 22. FIG. 6C is a graph showing the relationship between the dimming percentage of the unit light source 20 and the luminous flux radiated by the unit light source 20.

As illustrated in FIG. 6A, in the present embodiment, the luminous flux radiated by the first light source section 21 can stepwisely change to the maximum value of the luminous flux radiated by the one unit light source 20. Here, the luminous flux radiated by the first light source section 21 changes in five stages of 0%, 20%, 40%, 50%, and 60%. The change of the luminous flux radiated by the first light source section 21 for each stage becomes narrower as the dimming percentage of the unit light source 20 more increases. That is, as the dimming percentage of the unit light source 20 more increases, the change of the percentage of the luminous flux radiated by the first light source section 21 is suppressed.

The controlling unit 31 can realize the dimming control of the first light source section 21 by either the controlling method (B) or the controlling method (C) described in the first embodiment.

(B) The four light sources 23a of the first light source section 21 constantly radiate the luminous fluxes and control the amount of the radiation luminous fluxes.

(C) The number of the light sources 23a, which radiate the luminous fluxes, in the first light source section 21 and the amount of the radiation luminous fluxes are controlled.

However, the dimming control of the first light source section 21 is not limited to that in the above-described controlling method.

Next, the dimming control of the second light source section 22 will be described.

Figure 6B:
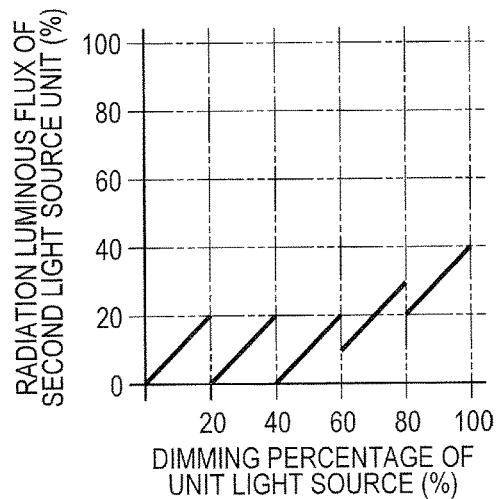

As illustrated in FIG. 6B, when the dimming percentage of the unit light source 20 is in the range of 0% to 60%, the luminous flux radiated by the second light source section 22 can steplessly change in the range of 0% to 20% to the maximum value of the luminous flux radiated by the one unit light source 20. Further, when the dimming percentage of the unit light source 20 is in the range of 60% to 80%, the luminous flux radiated by the second light source section 22 can steplessly change in the range of 10% to 30% to the maximum value of the luminous flux radiated by the one unit light source 20. Furthermore, when the dimming percentage of the unit light source 20 is in the range of 80% to 100%, the luminous flux radiated by the second light source unit 22 can steplessly change in the range of 20% to 40% to the maximum value of the luminous flux radiated by the one unit light source 20.

Figure 6C:
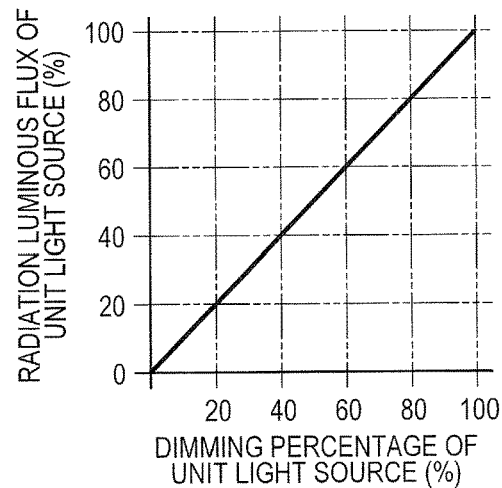

The controlling unit 31 can steplessly and linearly control the luminous flux radiated from the one unit light source 20 in the whole range of 0% to 100% in the entire unit light source 20 as illustrated in FIG. 6C by performing the dimming control of the first light source section 21 and the second light source section 22.

Further, the controlling unit 31 can homogenize the value of "the applied current value×the light emitting time" in the first light source section 21 and the second light source section 22 by relatively suppressing the percentage of the radiation luminous flux of the first light source section 21 in the range where the dimming percentage of the unit light source 20 is 60% or more.

(Third Embodiment)

Next, the dimming control according to the third embodiment will be described with reference to FIGS. 7A to 7E. In the first embodiment and the second embodiment, the luminous flux radiated by the first light source section 21 is uniquely determined according to the dimming percentage of the unit light source 20. In the present embodiment, even if it is the dimming percentage of the same unit light source 20 based on the temperature which is an example of a physical condition, the luminous flux radiated by the first light source section 21 can change within a certain range.

FIG. 7A is a graph showing the relationship between the dimming percentage of the unit light source 20 and the luminous flux radiated by the first light source section 21. FIG. 7B is a graph showing the relationship between the dimming percentage of the unit light source 20 and the luminous flux radiated by the second light source section 22. FIG. 7C is a graph showing the relationship between the dimming percentage of the unit light source 20 and the luminous flux radiated by the unit light source 20.

As illustrated in FIG. 7A, for example, when the dimming percentage of the unit light source 20 is in the range of 40% to 60%, the radiation luminous flux of the first light source section 21 changes in the range of 30% to 40% to the maximum value of the luminous flux radiated by the one unit light source 20.

Here, the dimming control of the first light source section 21 performed by the controlling unit 31 will be described with reference to FIG. 7D. FIG. 7D is a view of enlarging the range, which is from 40% to 60%, of the dimming percentage of the unit light source 20 in the graph of FIG. 7A. Here, the controlling unit 31 controls the luminous flux radiated by the first light source section 21 based on the temperature of the unit light source 20 as a physical condition. The physical condition is not limited to the temperature of the unit light source 20. The temperature of the unit light source 20 is measured by the temperature detecting units 38. The temperature detecting units 38 can measure either the first light source section 21 or the second light source section 22 as the temperature of the unit light source 20. The temperature detecting units 38 transmit the measured temperature information to the controlling unit 31 such that it can be identified for the each unit light source 20.

Here, the temperatures of the unit light sources are defined as th1, th2 and th3, and the normal temperature is defined as th0. At this time, the relationship of th0 to th3 is as follows.

$$th3 > th2 > th1 > th0$$

The respective temperatures of th1, th2 and th3 depend on the type of the light source used for the first light source section 21 and the second light source section 22 or the configuration or arrangement of the unit light sources 20. Accordingly, the temperatures th1, th2 and th3 are previously set according to the type of the light source or the configuration or arrangement of the unit light source 20.

As illustrated in FIG. 7D, when the temperature of the unit light source 20 is less than th1, the radiation luminous flux of the first light source section 21 is in the percentage of 40% to the maximum value of the luminous flux radiated by the one unit light source 20. This value is the same as that in the first embodiment. Further, when the temperature of the unit light source 20 is equal to or higher than th1, the percentage of the radiation luminous flux of the first light source section 21 is suppressed to 35% to the maximum value of the luminous flux radiated by the one unit light source 20. Further, when the temperature of the unit light source 20 is equal to or higher than th2, the percentage of the radiation luminous flux of the first light source section 21 is suppressed to 32.5% to the maximum value of the luminous flux radiated by the one unit light source 20. Further, when the temperature of the unit light source 20 is equal to or higher than th3, the percentage of the radiation luminous flux of the first light source section 21 is suppressed to 30% to the maximum value of the luminous flux radiated by the one unit light source 20.

Next, the dimming control of the second light source section 22 performed by the controlling unit 31 will be described with reference to FIG. 7B and FIG. 7E. FIG. 7E is a view of enlarging the range, which is from 40% to 60%, of the dimming percentage of the unit light source 20 in the graph of FIG. 7B.

The luminous flux radiated by the first light source section 21 changes based on the temperature of the unit light source 20. Similarly, the luminous flux radiated by the second light source section 22 also changes based on the temperature of the unit light source 20 as follows.

As illustrated in FIG. 7E, when the temperature of the unit light source 20 is less than th1, the radiation luminous flux of the second light source section 22 linearly changes within the range of 0% to 20% to the maximum value of the luminous flux radiated by the one unit light source in accordance with the dimming percentage of the unit light source 20. This change is the same as that in the first embodiment. When the temperature of the unit light source 20 is equal to or higher than th1, the radiation luminous flux of the second light source section 22 changes within the range of 5% to 25% to the maximum value of the luminous flux radiated by the one unit light source 20 in accordance with the dimming percentage of the unit light source 20. That is, on the graph of FIG. 7E, the entire luminous flux of the unit light source 20 is compensated by shifting the radiation luminous flux of the second light source section 22 upward by 5% suppressed by the first light source section 21. Further, when the temperature of the unit light source 20 is equal to or higher than th2, the radiation luminous flux of the second light source section 22 changes within the range of 7.5% to 27.5% to the maximum value of the luminous flux radiated by the one unit light source 20 in accordance with the dimming percentage of the unit light source 20. That is, on the graph of FIG. 7E, the entire luminous flux of the unit light source 20 is compensated by shifting the radiation luminous flux of the second light source section 22 upward by 7.5% suppressed by the first light source section 21. Further, when the temperature of the unit light source 20 is equal to or higher than th3, the radiation luminous flux of the second light source section 22 changes within the range of 10% to 30% to the maximum value of the luminous flux radiated by the one unit light source 20 in accordance with the dimming percentage of the unit light source 20. That is, on the graph of FIG. 7E, the entire luminous flux of the unit light source 20 is compensated by shifting the radiation luminous flux of the second light source section 22 upward by 10% suppressed by the first light source section 21.

The controlling unit 31 performs the dimming control to the first light source section 21 and the second light source section 22 and can steplessly and linearly control the radiation luminous flux of the one unit light source 20 in the whole range of 0% to 100% in the entire unit light sources 20 regardless of the temperature of the unit light source 20 as illustrated in FIG. 7C.

In addition, the controlling unit 31 can suppress the temperature of the entire unit light sources 20 without impairing the radiation luminous amount of the entire unit light sources 20 and the convenience of the dimming control by suppressing the radiation luminous flux of the first light source section 21, which is the base of the luminous flux radiated by the unit light source 20, in accordance with the temperature of the unit light source 20.

(Fourth Embodiment)

Next, the unit light source according to the fourth embodiment will be described with reference to FIGS. 8A and 8B.

Figure 8A:
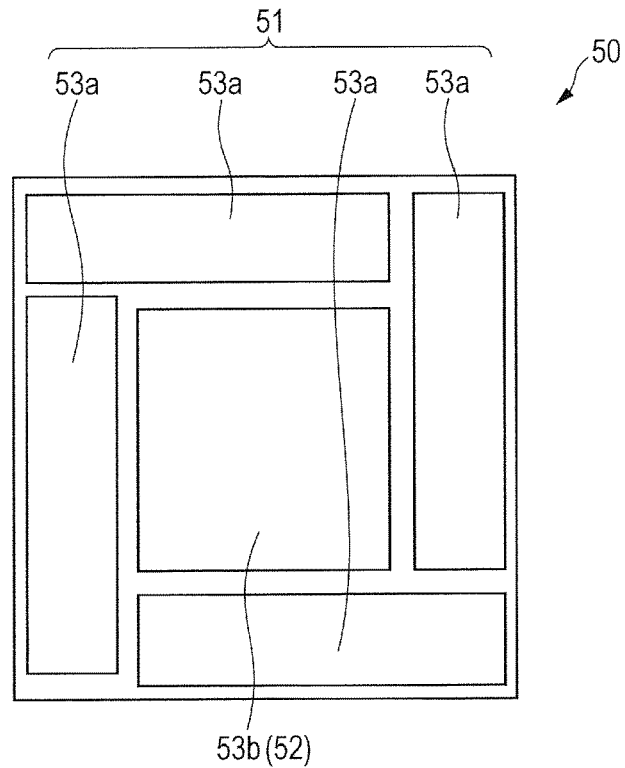
FIGS. 8A and 8B are diagrams showing an example of a configuration of a unit light source according to the fourth embodiment.

In a unit light source 50 indicated in FIG. 8A, light sources 53a of a first light source section 51 and a light source 53b of a second light source section 52 are both formed in a rectangular shape.

Figure 8B:
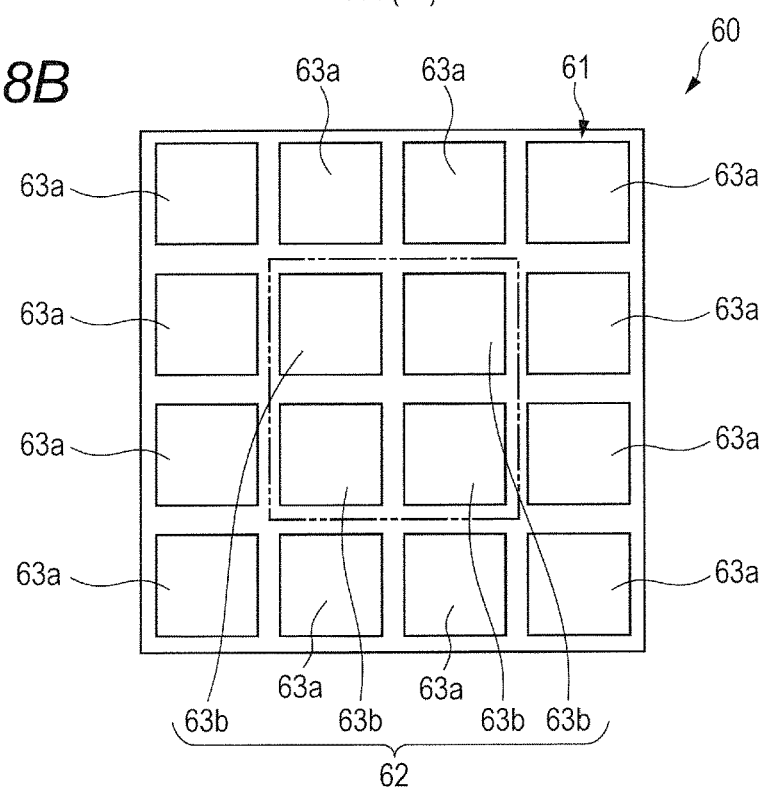

In a unit light source 60 indicated in FIG. 8B, light sources 63a of a first light source section 61 and light sources 63b of a second light source section 62 are formed in the same shape. Here, the first light source section 61 has a plurality (twelve pieces) of light sources 63a, and the second light source section 62 has a plurality (four pieces) of light sources 63b.

The luminous flux radiated from the unit light source can be smoothly changed by disposing the first light source section, which serves as the base of the unit light source, around the second light source section, which performs fine adjustment of the dimming, when the radiation plane is viewed from a direction perpendicular to the radiation plane.

The shapes of the light sources constituting the first light source section and the second light source section are not limited to the closed figures based on circles and curves indicated in FIG. 2B or the rectangles indicated in FIGS. 8A and 8B, and arbitrary shapes may be applied in consideration of easiness of the dimming control and easiness of the manufacturing. Further, the arrangement of the first light source section and the second light source section is not limited to the position in FIG. 2B or the positions in FIGS. 8A and 8B.

Although the present invention has been described in conjunction with various embodiments, the present invention is not limited only to these embodiments, and modifications and the like are possible within the scope of the present invention, and the above-described embodiments can be timely combined.

In the above-described embodiment, the case where the present invention is applied to a projector has been described as an example, but the present invention is not limited to this case and can be applied to a display using the light source device 10 as a backlight.

According to the configuration of the present embodiment, the noise generation can be reduced.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-049899, filed Mar. 14, 2016, which is hereby incorporated by reference herein in its entirety.

What is claimed is:

1. An image displaying apparatus comprising:
   a first light source section and a second light source section each configured to be able to change a percentage of a radiation luminous flux; and
   a controlling unit configured to control the first light source section and the second light source section such that the percentage of the radiation luminous flux obtained by combining together the radiation luminous flux from the first light source section and the radiation luminous flux from the second light source section continuously changes,
   wherein the first light source section comprises a plurality of light sources, and
   wherein the controlling unit is configured to be able to stepwisely change the percentage of the radiation luminous flux from the first light source section, by controlling the number of the light sources of radiating luminous flux from among the plurality of the light sources.

2. The image displaying apparatus according to claim 1, wherein the controlling unit is configured to be able to stepwisely change the percentage of the radiation luminous flux from the first light source section, and to be able to continuously change the percentage of the radiation luminous flux from the second light source section.

3. The image displaying apparatus according to claim 1, wherein, in a range of a predetermined percentage in the radiation luminous flux obtained by combining together the radiation luminous flux from the first light source section and the radiation luminous flux from the second light source section, the controlling unit is configured to keep the percentage of the radiation luminous flux from the first light source section substantially constant, and to be able to continuously change the percentage of the radiation luminous flux from the second light source section.

4. The image displaying apparatus according to claim 1, wherein the controlling unit is configured to select the light source of radiating the luminous flux in the first light source section, based on a light emitting time.

5. The image displaying apparatus according to claim 1, wherein the controlling unit is configured to be able to stepwisely change the percentage of the radiation luminous flux from the first light source section, such that a change of the percentage of the radiation luminous flux from the first light source section is suppressed according as the percentage of the radiation luminous flux obtained by combining together the radiation luminous flux from the first light source section and the radiation luminous flux from the second light source section becomes large.

6. The image displaying apparatus according to claim 1, further comprising a temperature detecting unit configured to detect a temperature of at least one of the first light source section and the second light source section, wherein
   the controlling unit is configured to be able to stepwisely change the percentage of the radiation luminous flux from the first light source section, such that the percentage of the radiation luminous flux from the first light source section is suppressed according as the temperature detected by the temperature detecting unit becomes high.

7. The image displaying apparatus according to claim 1, wherein
   the plurality of the light sources of the first light source section are arranged so as to surround the second light source section.

8. A controlling method of an image displaying apparatus comprising a first light source section and a second light source section each capable of changing a radiation luminous flux, the controlling method comprising:
   controlling a number of the light sources of radiating luminous flux from among a plurality of the light sources of the first light source section such that a percentage of a radiation luminous flux from the first light source section is changed stepwisely, and
   controlling the second light source section such that a percentage of a radiation luminous flux obtained by combining together the radiation luminous flux from the first light source section and the radiation luminous flux from the second light source section continuously changes.

9. A non-transitory computer-readable storage medium which stores therein a program for causing a computer to perform a controlling method of controlling an image displaying apparatus comprising a first light source section and a second light source section each capable of changing a radiation luminous flux, the program executing to:
   control a number of the light sources of radiating luminous flux from among a plurality of the light sources of the first light source section such that a percentage of a radiation luminous flux from the first light source section is changed stepwisely, and
   control the second light source section such that a percentage of a radiation luminous flux obtained by combining together the radiation luminous flux from the first light source section and the radiation luminous flux from the second light source section continuously changes.

10. An image displaying system in which a plurality of image displaying apparatuses set an overlapping area where at least a part of mutual images of the image displaying apparatuses overlap to a projection surface and display the images, wherein
    the image displaying apparatus comprises
       a first light source section and a second light source section each configured to be able to change a percentage of a radiation luminous flux to be radiated to the overlapping area, and
       a controlling unit configured to control the first light source section and the second light source section such that the percentage of the radiation luminous flux obtained by combining together the radiation luminous flux from the first light source section and the radiation luminous flux from the second light source section continuously changes.

11. A controlling method of an image displaying system in which a plurality of image displaying apparatuses set an overlapping area where at least a part of mutual images of the image displaying apparatuses overlap to a projection surface and display the images, wherein
    the image displaying apparatus comprises
       a first light source section and a second light source section each configured to be able to change a percentage of a radiation luminous flux to be radiated to the overlapping area, and
       a controlling unit configured to control the first light source section and the second light source section such that the percentage of the radiation luminous flux obtained by combining together the radiation luminous flux from the first light source section and the radiation luminous flux from the second light source section continuously changes.

12. An image displaying apparatus comprising:
a first light source section and a second light source section each configured to be able to change a percentage of a radiation luminous flux; and
a controlling unit configured to control the first light source section and the second light source section such that the percentage of the radiation luminous flux obtained by combining together the radiation luminous flux from the first light source section and the radiation luminous flux from the second light source section continuously changes,
wherein the controlling unit is configured to be able to stepwisely change the percentage of the radiation luminous flux from the first light source section, and to be able to continuously change the percentage of the radiation luminous flux from the second light source section.

* * * * *